(12) United States Patent
Youn et al.

(10) Patent No.: US 8,373,929 B2
(45) Date of Patent: Feb. 12, 2013

(54) LOW ABSORPTION OPTICAL COATING APPARATUS AND RELATED METHODS USING THF4/BAF2 COMBINATION

(76) Inventors: Mark W. Youn, Cypress, CA (US); Peter Muys, Mariakerke (BE); Yingwu Lian, Artesia, CA (US); Kurt Kanzler, Sacramento, CA (US)

( * ) Notice: Subject to any disclaimer, the term of this patent is extended or adjusted under 35 U.S.C. 154(b) by 478 days.

(21) Appl. No.: 12/665,480

(22) PCT Filed: Jun. 18, 2007

(86) PCT No.: PCT/US2007/071487
§ 371 (c)(1),
(2), (4) Date: Jun. 14, 2010

(87) PCT Pub. No.: WO2008/156479
PCT Pub. Date: Dec. 24, 2008

(65) Prior Publication Data
US 2010/0246013 A1    Sep. 30, 2010

(51) Int. Cl.
*G02B 1/10* (2006.01)
(52) U.S. Cl. ........................................ 359/581; 359/586
(58) Field of Classification Search ................. 359/580, 359/581, 586
See application file for complete search history.

(56) References Cited

U.S. PATENT DOCUMENTS

| | | | | |
|---|---|---|---|---|
| 4,612,234 A | * | 9/1986 | Miyata et al. | 428/215 |
| 4,735,488 A | * | 4/1988 | Rancourt et al. | 359/586 |
| 6,020,992 A | * | 2/2000 | Georgiev et al. | 359/359 |
| 6,396,630 B1 | * | 5/2002 | Stiens et al. | 359/489.07 |
| 2002/0080843 A1 | * | 6/2002 | Iwamoto et al. | 372/92 |

FOREIGN PATENT DOCUMENTS

FR     2880566 A1  *  7/2006

* cited by examiner

*Primary Examiner* — Alessandro Amari
*Assistant Examiner* — Kimberly N Kakalec

(57) ABSTRACT

A very low energy-absorption coating and related methods for use with high power CO2 lasers includes at least a thin layer of ThF4 (16) used as a water/moisture barrier, in combination with BaF2 (14), for various optical elements. When used in connection with a ZnSe substrate (12) or any other suitable material (such as for a focusing lens), the coating (10) extends the useful life by helping prevent moisture adsorption that otherwise may occur within 2-3 days of contact with air. The coating (10) may comprise (1) a BaF2 layer (14) of approximately optical quarter wave thickness, (2) a thin 200-300 Angstrom layer of ThF4 (16) used as a water barrier (3) a thin 1000-2000 Angstrom layer of ZnSe (18), and (4) an optional ZnSe layer (20) of optical half wave thickness. Among other applications, the coating (10) provides very low energy absorption for a 10.6 um CO2 laser at a value<0.15%, and provides longer lifetimes as compared to conventional coated lenses without the combination of BaF2 (14) and ThF4 (16). The specific and relative thicknesses of the various coating layers can be modified substantially and still provide many benefits.

23 Claims, 1 Drawing Sheet

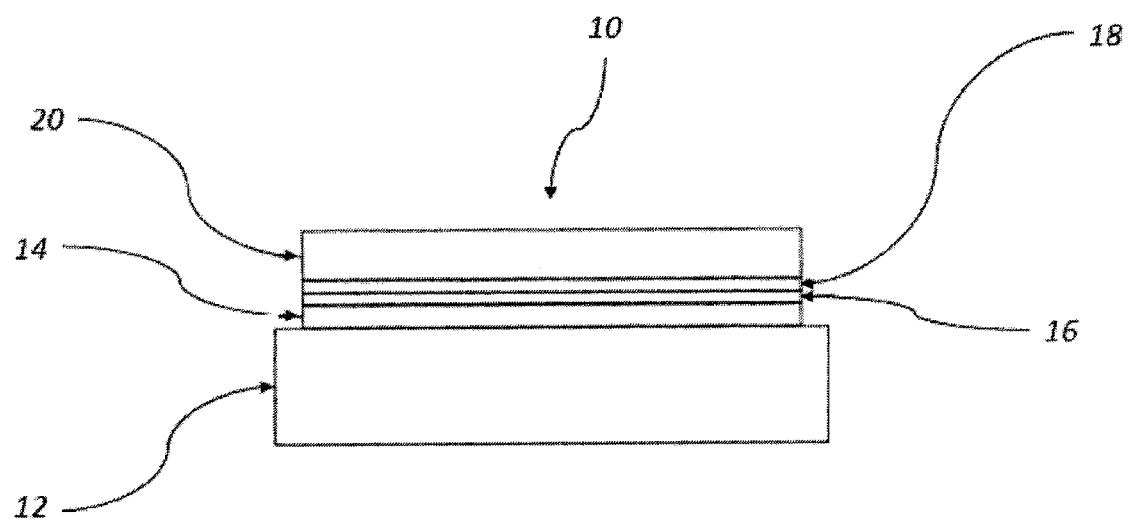

LOW ABSORPTION OPTICAL COATING APPARATUS AND RELATED METHODS USING THF4/BAF2 COMBINATION

FIELD OF THE INVENTION

The present invention relates generally to coatings and related methods for use with high power CO2 lasers. More particularly, the present invention relates to coatings that include at least a thin layer of ThF4 used as a water/moisture barrier, in combination with BaF2, for various optical elements. When used in connection with a ZnSe substrate or any other suitable material (such as for a focusing lens), the coating extends the element's useful life by preventing moisture adsorption that otherwise may occur within 2-3 days of contact with air. When used over a BaF2 layer, the ThF4 helps stop moisture from reaching the BaF2 (where the moisture could adsorb (or chemically bond) and raise the energy absorption level of the optical element), thereby extending the life of the optical element and its usefulness (such as, for example, as a laser focusing lens).

INCORPORATION BY REFERENCE

The contents of each U.S. patent or other references, if any, cited in this application, are hereby incorporated by reference.

BACKGROUND OF THE INVENTION

The desirability and benefits of low-absorption anti-reflective coatings for use in high power laser optical elements is well known, as are many of the techniques for fabricating and applying such coatings. For example, U.S. Pat. No. 6,020,992 to Georgiev et al. includes an overview in its Description of Related Art. The anti-reflective aspect of such coatings improves the percentage of radiation that is transmitted through the lens or other optical element (by decreasing the amount reflected). The coatings typically include an approximate optical quarter wave fluoride layer, and the types of fluorides used vary in the degree to which they absorb the energy being transmitted. By absorbing less of the energy, more energy is available for the laser application itself, thereby improving the performance of the laser and providing other benefits.

The performance of these coatings can begin degrading once they are exposed to air or other environments. The thick fluoride layers tend to adsorb water vapor (again, in varying degrees), and that adsorption can "degrade" the coating so that it correspondingly absorbs increasing amounts of the laser energy and otherwise negatively effects the performance of the laser. At a certain level of water adsorption and energy absorption, the lens or other optical element must be replaced. Thus, preventing adsorption of water vapor or moisture into the thick fluoride layer can extend the useful life of the coating and thereby the life of the lens or other optical element.

SUMMARY OF THE INVENTION

For the purpose of summarizing the invention certain objects and advantages have been described herein. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages, without necessarily achieving other objects or advantages, as may be taught or suggested herein.

The present invention relates to very low absorption coatings and related methods for use with high power CO2 lasers. In a preferred embodiment, the coating may comprise (1) a BaF2 layer of approximately optical ¼ wave thickness, (2) a thin (200-300 Angstrom) layer of ThF4 used as a water/moisture barrier (3) a thin (1000-2000) Angstrom) layer of ZnSe, and (4) an optional ZnSe layer of optical ½ wave thickness. Among other applications, the coating provides very low energy absorption for 9.2-11.2 um CO2 lasers (at a value<0.15%), and provides better performance and longer lifetimes as compared to conventional coated lenses without the combination of BaF2 and ThF4. Persons of ordinary skill in the art will understand that the "wave" thickness discussed herein refers to a wavelength determined by known factors, including (by way of example and not by way of limitation) the materials selected for the coating.

A wide variety of alternative embodiments of the invention include, also by way of example and not by way of limitation, the BaF2 layer being selected from a relatively wide range of "wave thicknesses". These can include layers of less than ¼ wave thickness, a range of approximately 50% to 100% of ¼ wave thickness, and a theoretically even broader range of approximately 5% to 150% or more of ¼ wave thickness. Persons of ordinary skill in the art will further understand that one or both of the thicknesses of that BaF2 layer and the "thin" ZnSe layer discussed below (and/or the other layers) can be adjusted (both absolutely and relatively to each other) depending on the specific optical element and other factors, to achieve a desired optical performance. Among other things, these adjustments affecting the phase characteristics of the finished optical element. The "thin" ZnSe can even be increased to be as thick as the "thick" ZnSe layer discussed below, and/or the "thick" and "thin" ZnSe layers can be "combined" and/or deposited as a "single" thick layer.

These and other embodiments and benefits of the invention will become readily apparent to persons of ordinary skill in the art, from the following detailed description of the preferred embodiments and the attached figures (the invention not being limited to any particular preferred or other embodiment(s) disclosed).

BRIEF DESCRIPTION OF THE DRAWING(S)

For a more complete understanding of the invention, the detailed description refers to the accompanying drawing(s), in which:

FIG. 1 is a cross-sectional view of substrate and coating formed thereon, in accordance with one of the many embodiments of the present invention.

DETAILED DESCRIPTION

Embodiments of the present invention will now be described with references to the accompanying Figures, wherein like reference numerals refer to like elements throughout. The terminology used in the description presented herein is not intended to be interpreted in any limited or restrictive manner, simply because it is being utilized in conjunction with a detailed description of certain embodiments of the invention. Furthermore, various embodiments of the invention (whether or not specifically described herein) may include novel features, no single one of which is solely responsible for its desirable attributes or which is essential to practicing the invention herein described.

FIG. 1 illustrates one of the many embodiments of the present invention, and shows a coating configuration 10 having a substrate 12 and various layers 14, 16, 18, and 20 deposited thereon. In one embodiment, the substrate 12 can be a high index optical material such as ZnSe. Persons of ordinary skill in the art will understand that this is a common material for laser lenses or other optical elements, and that the invention can be practiced on such lenses or other elements such as output coupling mirrors or the like. Persons of ordinary skill in the art also will understand that the coating of the invention could be deposited on various suitable materials other than ZnSe and still provide very low absorption/adsorption characteristics and/or other benefits of the invention.

In the embodiment of FIG. 1, a BaF2 layer 14 of approximately an optical quarter wave thickness is deposited onto the substrate 12. This can be accomplished via ion-assisted deposition, conventional thermal evaporation, or any suitable method. As indicated above, persons of ordinary skill in the art will understand that, the BaF2 layer can be selected from a relatively wide range of "wave thicknesses", including layers less than ¼ wave thickness, a range of approximately 50% to 100% of ¼ wave thickness, and/or an even broader range of approximately 5% to 150% or more of ¼ wave thickness.

Next, a thin layer 16 of ThF4 is deposited on the BaF2 layer 14. The thin layer 16 of ThF4 preferably is approximately 200-300 Angstroms, and is used to help provide an extra water/moisture barrier over the BaF2 layer 14. Next, a thin layer 18 of ZnSe (also approximately 1000-2000 Angstroms thick) is deposited on the layer 16 of ThF4. In many applications and embodiments, this thin layer 18 may be the last/exterior layer in the coating, and helps provide a further water/moisture barrier over the BaF2 layer 14.

For certain applications, it may be beneficial to deposit a further layer 20 on the thin ZnSe layer 18. In the embodiment of FIG. 1, this further layer 20 can be ZnSe in approximately an optical half wave thickness.

As also mentioned above, persons of ordinary skill in the art will further understand that one or both of the thicknesses of the BaF2 layer 14 and the "thin" ZnSe layer 18 (and/or the other layers) can be adjusted (both absolutely and relatively to each other) depending on the specific optical element and other factors, to achieve a desired optical performance. Among other things, these adjustments affecting the phase characteristics of the finished optical element. The "thin" ZnSe layer 18 can even be increased to be as thick as the "thick" ZnSe layer 20, and/or the "thick" and "thin" ZnSe layers can be "combined" and/or deposited as a "single" thick layer.

Persons of ordinary skill in the art will understand that the coating of the invention and its various layers can be fabricated via any suitable method(s) and using any suitable technology.

The present invention provides an anti-reflective coating (for use with 9.2-11.2 um CO2 lasers or other applications) at a very low energy absorption value (<0.15%). This coating allows for better performance and longer lifetimes as compared to conventional coated lenses without the present invention's combination of BaF2 and ThF4. The BaF2 and ThF4 can be co-evaporated as well. For example, coating technologies other than the present invention can experience an aging effect that degrades the coating's low energy absorption properties within a few days of contact with air. Even other technologies that use a ½ wave of ZnSe as an outer layer for a moisture barrier (but without the thin layer 16 of ThF4 of the present invention) age quickly to show higher energy absorption values beyond 0.20% within 2-3 days of contact with air. Recent testing shows that the coating of the present invention can be in contact with air for at least one month and still measure an absorption of 0.114%, even in a high humidity environment, and shows little, if any, signs of aging. Those tests on ZnSe substrates indicate that the coating of the present invention significantly extends the effectiveness of preventing moisture adsorption in applications such as lenses and other optical elements.

The apparatus and methods of the present invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

What is claimed is:

1. A coated optical element for optical radiation at a given wavelength, comprising:
   an optical substrate; and
   an anti-reflective coating formed on said substrate, said coating comprising:
   a BaF2 layer of approximately an optical quarter wave thickness above the substrate;
   a thin layer of ThF4 above the BaF2 layer; and
   a thin layer of ZnSe above the ThF4 layer.

2. The coated optical element of claim 1, in which said thin layer of ThF4 is approximately 200-300 Angstroms thick.

3. The coated optical element of claim 1, in which said thin layer of ThF4 provides a water/moisture barrier to reduce adsorption of moisture by the BaF2 layer.

4. The coated optical element of claim 1, in which said thin layer of ZnSe is approximately 1000-2000 Angstroms thick.

5. The coated optical element of claim 1, in which said thin layer of ZnSe provides a water/moisture barrier to reduce adsorption of moisture by the BaF2 layer.

6. The coated optical element of claim 1, further including an additional layer of ZnSe of approximately optical half wave thickness above said thin layer of ZnSe.

7. The coated optical element of claim 1, in which said BaF2 layer has a thickness between 50% and 100% of an optical ¼ wave.

8. The coated optical element of claim 1, in which said BaF2 layer has a thickness between 5% and 150% of an optical ¼ wave.

9. The coated optical element of claim 1, in which said BaF2 layer has a thickness less than an optical ¼ wave thickness.

10. Apparatus comprising:
    a laser source; and
    a coated optical element of claim 1 appropriately positioned with respect to said laser source.

11. The apparatus of claim 10, in which said optical element is a focusing lens.

12. The apparatus of claim 10, in which said optical element is a mirror.

13. A method for delivering a beam from a laser, comprising the steps of:
    providing a suitable laser source;
    providing a coated optical element of claim 1 appropriately positioned with respect to said laser source; and
    activating the laser source.

14. A coating for use in manipulating optical radiation at a given wavelength, comprising:
    a BaF2 layer of approximately an optical quarter wave thickness;
    a thin layer of ThF4 above the BaF2 layer; and
    a first layer of ZnSe above the ThF4 layer.

15. The coating of claim 14, in which said BaF2 layer has a thickness between 50% and 100% of an optical ¼ wave.

16. The coating of claim 14, in which said BaF2 layer has a thickness between 5% and 150% of an optical ¼ wave.

17. The coating of claim 14, in which said BaF2 layer has a thickness less than an optical ¼ wave.

18. The coating of claim 14, in which the thickness of said first layer of ZnSe is relatively thin compared to said BaF2 layer.

19. The coating of claim 14, in which the thickness of said first layer of ZnSe is in the range of 1000-2000 Angstrom.

20. The coating of claim 14, in which the thickness of said first layer of ZnSe is approximately 10-20% of an optical ¼ wave.

21. The coating of claim 14 or 15 or 16 or 17 or 18 or 19, further including an additional layer of ZnSe of approximately optical ½ wave thickness above said first layer of ZnSe.

22. The coating of claim 14, in which the given wavelength is 9.2 to 11.2 microns.

23. The combination of an optical element for manipulating optical radiation at a given wavelength and an anti-reflective coating on said element, comprising:
 an optical substrate configured and having selected characteristics of transmission and/or reflection;
 a BaF2 layer of approximately an optical quarter wave thickness or less above the substrate;
 a thin layer of ThF4 above the BaF2 layer; and
 a thin layer of ZnSe above the ThF4 layer.

* * * * *